United States Patent
Tanigawa et al.

(10) Patent No.: US 8,401,486 B2
(45) Date of Patent: Mar. 19, 2013

(54) WIRELESS BASE STATION EQUIPMENT AND MONITORING CONTROL METHOD

(75) Inventors: Daisuke Tanigawa, Kawasaki (JP); Hidehiko Oyane, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 460 days.

(21) Appl. No.: 12/549,930

(22) Filed: Aug. 28, 2009

(65) Prior Publication Data

US 2010/0056065 A1 Mar. 4, 2010

(30) Foreign Application Priority Data

Aug. 29, 2008 (JP) .................................. 2008-221761

(51) Int. Cl.
*H04B 17/00* (2006.01)
*H04W 24/00* (2009.01)

(52) U.S. Cl. ...................... 455/67.11; 455/424; 455/561

(58) Field of Classification Search ............... 455/67.11, 455/68
See application file for complete search history.

(56) References Cited

U.S. PATENT DOCUMENTS

| | | | | |
|---|---|---|---|---|
| 5,437,019 A | * | 7/1995 | Brockmann | ...................... 711/5 |
| 6,243,773 B1 | * | 6/2001 | Mahalingam | ................. 710/302 |
| 6,577,863 B2 | * | 6/2003 | Bourlas et al. | ................. 455/424 |
| 7,843,907 B1 | * | 11/2010 | Abou-Emara et al. | ........ 370/386 |
| 7,953,903 B1 | * | 5/2011 | Finkelstein et al. | ............ 710/14 |
| 2005/0221764 A1 | * | 10/2005 | Shen et al. | ................. 455/67.15 |
| 2008/0045244 A1 | | 2/2008 | Takada | |

FOREIGN PATENT DOCUMENTS

| | | |
|---|---|---|
| JP | 10-174144 | 6/1998 |
| JP | 2003-110508 | 4/2003 |
| JP | 2004-214814 | 7/2004 |
| JP | 2005-39386 | 2/2005 |
| JP | 2007-507957 | 3/2007 |
| JP | 2008-17245 | 1/2008 |
| WO | WO 2005/034544 A1 | 4/2005 |

* cited by examiner

*Primary Examiner* — Temesgh Ghebretinsae
*Assistant Examiner* — Gennadiy Tsvey
(74) *Attorney, Agent, or Firm* — Oblon, Spivak, McClelland, Maier & Neustadt, L.L.P.

(57) ABSTRACT

Wireless base station equipment including a plurality of amplifiers and modulation and demodulation equipment having a monitoring control link with each of the plurality of amplifiers. The modulation and demodulation equipment terminates communications with the plurality of amplifiers and performs a monitoring control of each of the plurality of amplifiers. Each of the of amplifiers includes a plurality of cards as respective functional sections and a transmission and reception-integrated section that collects transmission and reception signals input to and output from each of the plurality of cards and terminates communication with the modulation and demodulation equipment. The modulation and demodulation equipment obtains, from a transmission and reception-integrated section of a corresponding amplifier via a monitoring control link with the corresponding amplifier, information related to the corresponding amplifier. The modulation and demodulation equipment performs the monitoring control based on the obtained information.

17 Claims, 7 Drawing Sheets

| Number of cards | Slot No. | Amplifier A | Amplifier B | Amplifier C |
|---|---|---|---|---|
| Card A | 1 | 3<br>TRX-INF<br>TRX<br>T-PA<br>LNA | 4<br>TRX-INF | 1<br>TRX-INF<br>TRX<br>T-PA<br>External IF |
| Card B | 2 | TRX-INF<br>TRX<br>T-PA<br>LNA | TRX-INF<br>T-PA | |
| Card C | 3 | External IF | TRX<br>T-PA | |
| Card D | 4 | | External IF | |

BACKGROUND ART

Fig. 3

WIRELESS BASE STATION EQUIPMENT AND MONITORING CONTROL METHOD

TECHNICAL FIELD

The present invention relates to wireless base station equipment including an amplifier remotely provided via a transmission line such as optical fibers from modulation and demodulation equipment and a monitoring control method.

BACKGROUND ART

In recent years, there have been a configuration of wireless base station equipment where modulation and demodulation equipment (MDE) is connected via optical fibers to a transmission amplifier (AMP) and an optical feeder transmitter and receiver (OF-TRX) so that the former is remote from the latter. The AMP section additionally includes an open air receiver amplifier (OARA) and an open air receiver amplifier supervisory controller (OARASC) for the monitoring control of the OARA section. External equipment, which is an object of the monitoring control by the MDE section, includes the OARA as well as a power source unit, an antenna tilt control box, and a maintenance tool for example.

The MDE section, the AMP section, and the OF-TRX section have various functional sections, respectively. The respective functional sections are configured by substrate-like hardware equipment including a CPU for carrying out a software processing. This hardware equipment is called a card (see Japanese Unexamined Patent Publication No. 2008-17245 for example).

FIG. 1 illustrates an example of amplifier 100 structured so that a plurality of cards A, B, C, and D as a functional section are mounted. This amplifier 100 may be considered to have a form where the AMP section includes the OF-TRX section and is connected to an MDE section 104 via an optical fiber cable 102.

By the way, as shown in FIG. 2, the plurality of amplifiers 100 (hereinafter sometimes referred to as amplifiers A and B) provided to be remote from the MDE section 104 are connected to the MDE section 104 via the optical fiber cables 102. When a new amplifier 100 (hereinafter sometimes referred to as amplifier C) is additionally connected to the MDE section 104 via the optical fiber cable 102 in the configuration as described above, a disadvantage as shown below is caused in the case of the conventional technique.

Specifically, in a conventional system, the MDE section 104 recognizes, in advance, the card configuration and the functional sections of the amplifiers A and B for example (information related to the amplifier) as shown in the table frame at the upper side of FIG. 2. Based on this information, communication is established between the amplifiers A and B, and the state monitoring control among the cards A, B, C, and D is carried out. Specifically, the MDE section 104 includes therein, in advance, the information such as the types of the amplifiers A and B, the slot Nos. of the mounted cards A, B, C, and D, the functional sections of the mounted cards A, B, C, and D (e.g., TRX-INF: a communication terminal functional section with the MDE section, TRX: a transmission and reception functional section, T-PA: a transmission amplification section, LNA: a low noise amplification section, external IF: external equipment IF card (e.g., OARA, PC or the like, ground input and output IF)) and the failure items regarding the respective functional sections. After the link between the MDE section 104 and the amplifiers A and B is established, the MDE section 104 carries out the monitoring control of the respective cards A, B, C, and D. When a failure occurs, the respective functional sections are subjected to suitable controls.

However, in the case of this system in which the MDE section 104 has a structure corresponding to the amplifiers A and B, the MDE section 104 obtains information from the amplifiers A and B based on the data recognized in advance. Due to this structure, when a new amplifier C is added (or changed), a need is caused where the to-be-added amplifier C must be adapted to this existing system configuration. For example, a need is caused where the amplifier C must be the one manufactured by the same manufacturer of the amplifiers A and B. Some restriction also may be required on the card configuration of the amplifier C (e.g., card structure, redundant configuration, slot No, functional section) and the functional section (by limiting the card configuration required for the manufacturer for example). Furthermore, another need is also required to re-configure the MDE section 104 so that the amplifier C can be used. In other words, when new data is set (or information is updated) in the system, the equipment in the system must be reset in order to reflect the new data or the update. This means that the services being provided by the operating amplifiers A and B must be suspended. Furthermore, the disadvantage as described above is severer in the case where the amplifiers A, B, and C are manufactured by different manufacturers, respectively, as shown in FIG. 3.

The present invention has been made in view of the points as described above. It is an objective of the present invention to provide wireless base station equipment and a monitoring control method by which an amplifier can be added or changed to perform a monitoring control smoothly without causing restriction on the card configuration and the functional section of the amplifiers and without causing any influence on the operating amplifiers (or causing a suspension of the service for example).

SUMMARY OF THE INVENTION

The wireless base station equipment of the present invention is wireless base station equipment in which an amplifier and modulation and demodulation equipment have therebetween a monitoring control link for each sector through which a monitoring control for each sector is performed, wherein:

the modulation and demodulation equipment and the amplifier connected thereto have transmission and reception-integrated sections for terminating communication, respectively, and the transmission and reception-integrated section of the modulation and demodulation equipment obtains information related to the amplifier via the respective links and subjects the amplifier to a monitoring control via the respective links.

According to this configuration, the transmission and reception-integrated section of the modulation and demodulation equipment obtains information related to each amplifier via each link. Thus, the links are completely independent from each other (i.e., information to another link is independent) and another link is not influenced by the state of one link such as the suspension of the one link.

Furthermore, no restriction is caused between the links. Therefore, an amplifier can be added or changed to perform a monitoring control smoothly without causing limitation on the card configuration and functional section of the amplifiers for example and without causing any influence on the operating amplifiers (e.g., suspension of the service).

In the wireless base station equipment of the present invention, the transmission and reception-integrated sections corresponding to the respective links of the modulation and demodulation equipment preferably clear the information regarding the amplifiers connected to the links when the links are disconnected. According to this configuration, without being influenced by the information regarding the existing or previous amplifier, the latest information can be updated and a new amplifier can be connected in a prompt and simple manner.

In the wireless base station equipment of the present invention, the transmission and reception-integrated section of the modulation and demodulation equipment preferably obtains the information related to the amplifier for each link at a timing of the start thereof. According to this configuration, no influence is caused on an operating sector and a service for setting an additional sector can be performed in a prompt and simple manner, thus achieving an operation for setting an additional sector in a simple and economical manner.

In the wireless base station equipment of the present invention, the transmission and reception-integrated sections corresponding to the respective links of the modulation and demodulation equipment are preferably structured, after the communication with an amplifier connected to the link is established, to obtain the information related to the amplifier during the running thereof.

In the wireless base station equipment of the present invention, a monitoring control signal is preferably transmitted and received among the respective amplifiers and the modulation and demodulation equipment via common interfaces for all links.

In the wireless base station equipment of the present invention, the respective amplifiers are preferably provided to be remote from the modulation and demodulation equipment via transmission lines.

The monitoring control method of the present invention is a monitoring control method in which an amplifier and modulation and demodulation equipment have therebetween a monitoring control link for each sector through which a monitoring control for each sector is performed, comprising:

allowing a transmission and reception-integrated section for terminating communication in the modulation and demodulation equipment to obtain the information related to the amplifier via the respective links; and subjecting the amplifier to a monitoring control via the respective links.

According to this method, the transmission and reception-integrated section of the modulation and demodulation equipment obtains the information related to each amplifier via the respective links. Thus, the links are completely independent from each other (i.e., information to another link is independent) and another link is not influenced by the state of one link such as the suspension of the one link. Furthermore, no restriction is caused between the links. Therefore, an amplifier can be added or changed to perform a monitoring control smoothly without causing limitation on the card configuration and functional section of the amplifiers for example and without causing any influence on the operating amplifiers (e.g., suspension of the service).

In the monitoring control method of the present invention, the transmission and reception-integrated sections corresponding to the respective links of the modulation and demodulation equipment preferably clear the information regarding the amplifiers connected to the links when the links are disconnected. According to this method, without being influenced by the information regarding the existing or previous amplifier, the latest information can be updated and a new amplifier can be connected in a prompt and simple manner.

In the monitoring control method of the present invention, the transmission and reception-integrated section of the modulation and demodulation equipment preferably obtains the information related to the amplifier for each link at a timing of the start thereof. According to this method, no influence is caused on an operating sector and a service for setting an additional sector can be performed in a prompt and simple manner, thus achieving an operation for setting an additional sector in a simple and economical manner.

In the monitoring control method of the present invention, the transmission and reception-integrated sections corresponding to the respective links of the modulation and demodulation equipment are preferably structured, after the communication with an amplifier connected to the link is established, to obtain the information related to the amplifier during the running thereof.

In the monitoring control method of the present invention, a monitoring control signal is preferably transmitted and received among the respective amplifiers and the modulation and demodulation equipment via common interfaces for all links.

According to the present invention, information related to the respective amplifiers is obtained via the respective links. Thus, the links are completely independent from each other (i.e., information to another link is independent) and another link is not influenced by the state of one link such as the suspension of the one link. Furthermore, no restriction is caused between the links. Therefore, an amplifier can be added or changed to perform a monitoring control smoothly without causing limitation on the card configuration and functional section of the amplifiers for example and without causing any influence on the operating amplifiers (e.g., suspension of the service).

BRIEF DESCRIPTION OF THE DRAWINGS

FIG. 3 illustrates an example of the card configuration of the amplifier in the wireless base station equipment;

DETAILED DESCRIPTION OF PREFERRED EMBODIMENTS

Hereinafter, an embodiment of the present invention will be described in detail with reference to the attached drawings.

Figure 1:
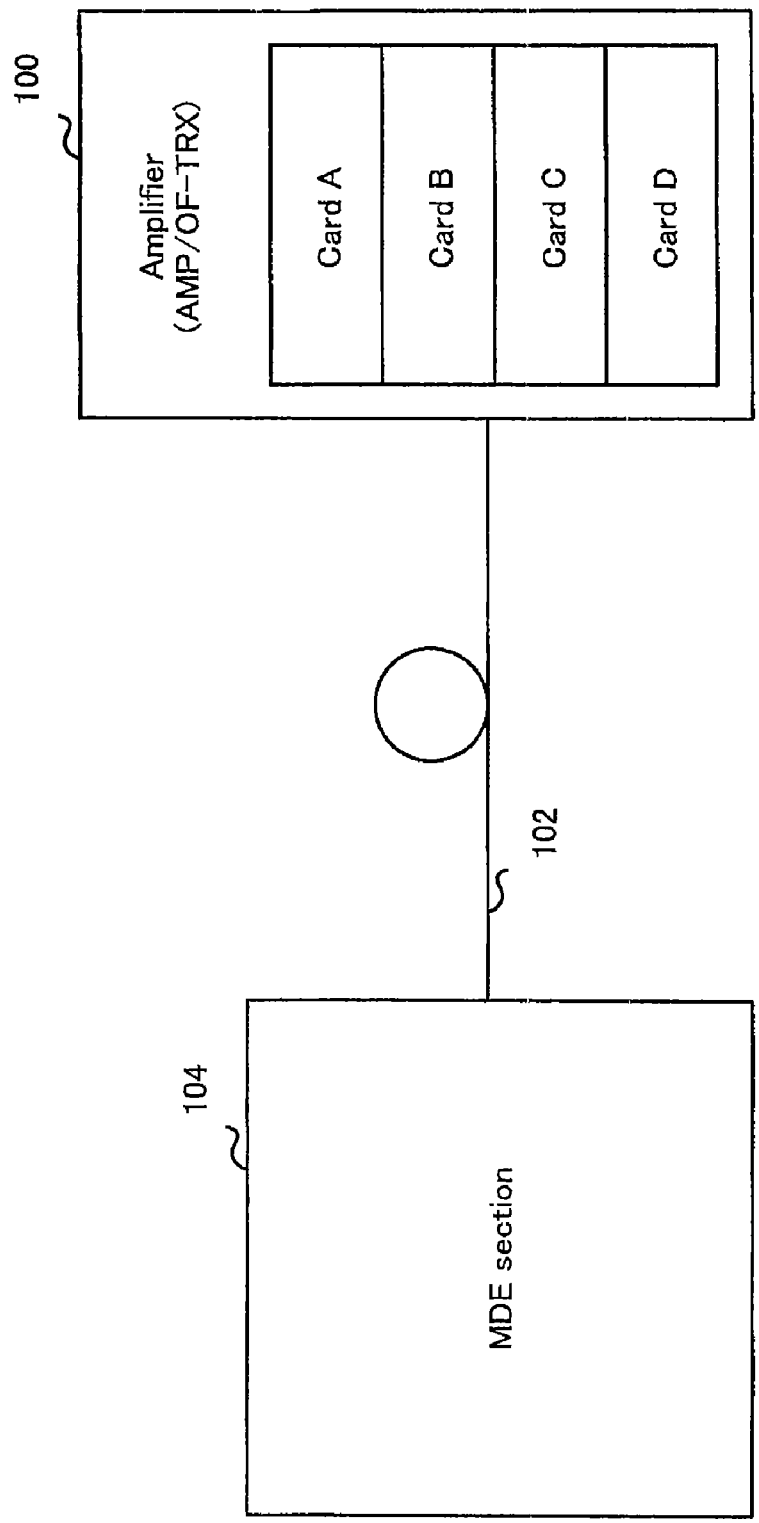
FIG. 1 is a conceptual diagram illustrating the wireless base station equipment.
Figure 2:
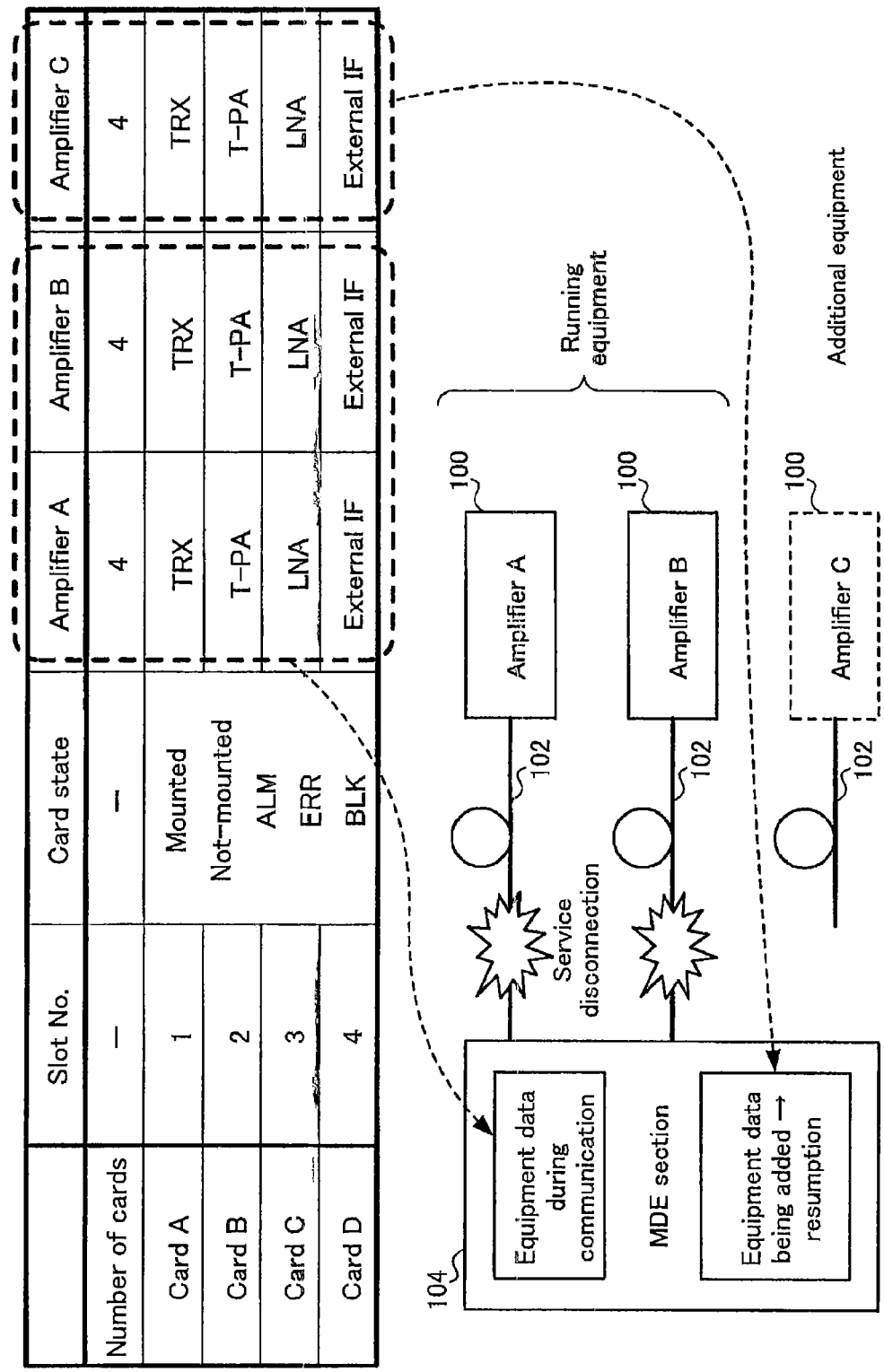
FIG. 2 illustrates a configuration example of the wireless base station equipment and an example of the card configuration of the amplifier.
Figure 4:
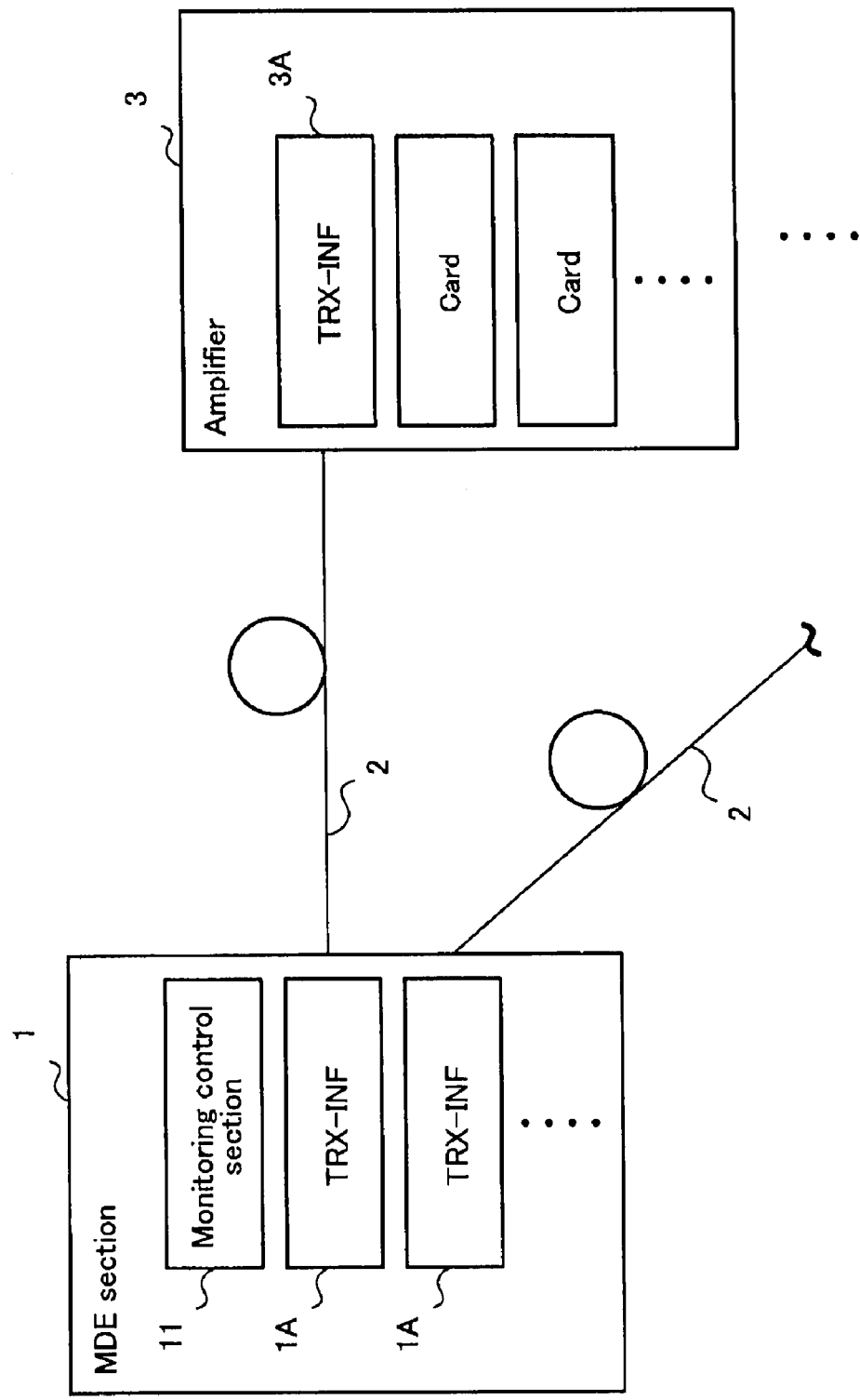
FIG. 4 is a conceptual diagram illustrating wireless base station equipment according to an embodiment of the present invention.

FIG. 4 is a conceptual diagram illustrating wireless base station equipment according to the embodiment of the present invention. This wireless base station equipment includes: an MDE section 1; and a plurality of amplifiers 3 that are provided to be remote from the MDE section 1 and that are connected to the MDE section 1 via an optical fiber cable 2 as a transmission line (in this embodiment, the AMP section includes the OF-TRX section). In this case, the amplifiers 3 are structured by mounting a plurality of cards as a functional section. The amplifiers 3 and the MDE section 1 have therebetween monitoring control links through which the respective sectors can be subjected to the monitoring control. The modulation and demodulation equipment 1 and the amplifiers 3 of the respective sectors connected to the modulation and demodulation equipment 1 have transmission and reception-integrated sections (TRX-INF) 1A and 3A for terminating the communication, respectively. The information collected in the transmission and reception-integrated sections 1A and 3A can be transmitted and received via the respective links between the transmission and reception-integrated sections 1A and 3A.

The MDE section 1 includes: a monitoring control section 11; a base band signal processing functional section; a call processing control functional section; and a transmission path interface functional section (not shown). The monitoring control section 11 is a functional section that subjects the amplifiers 3 to a monitoring control.

Figure 5:
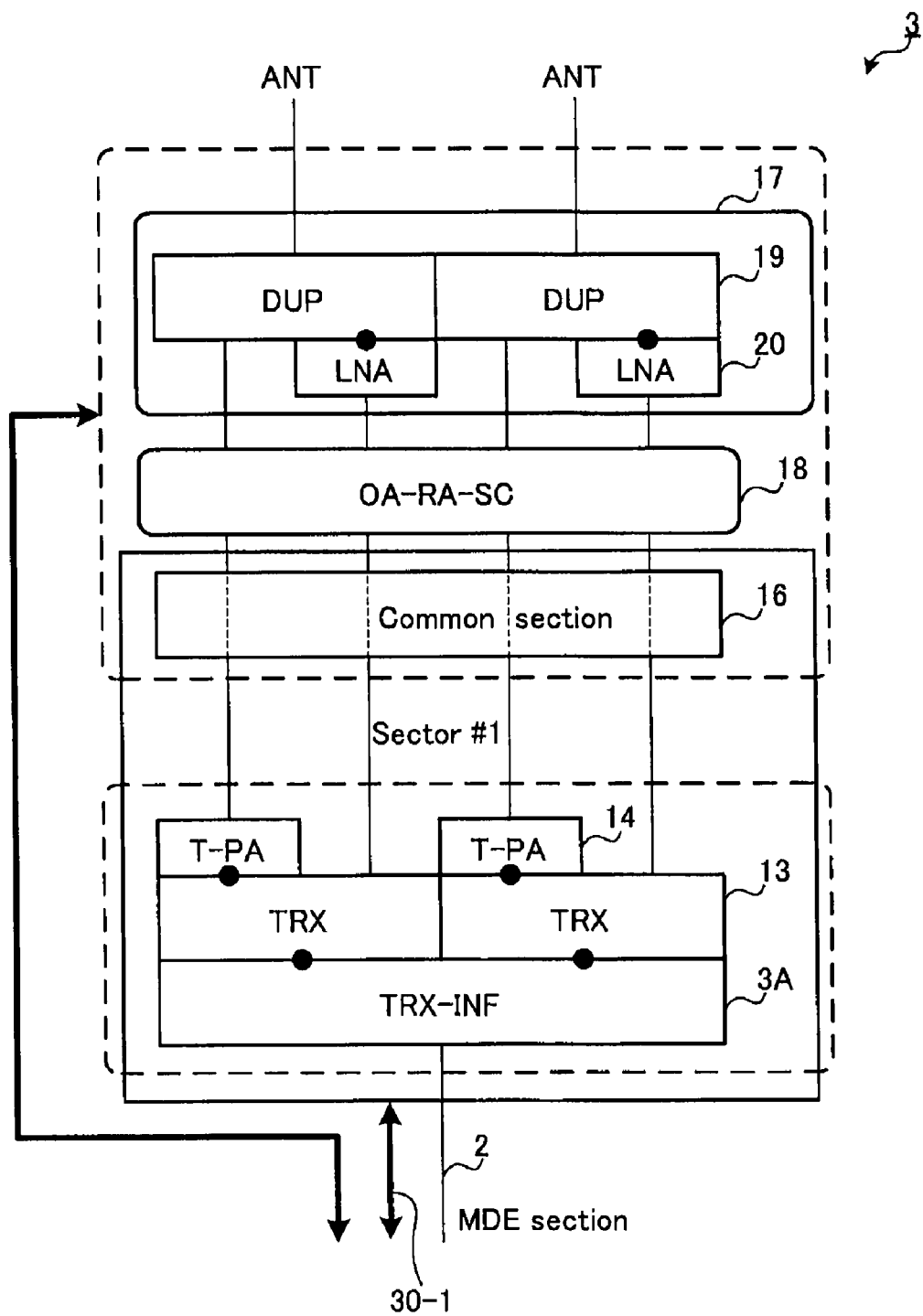
FIG. 5 illustrates the configuration of a functional section of the amplifier in the wireless base station equipment according to the embodiment of the present invention.

FIG. 5 illustrates the configuration of the functional section of the amplifier 3. The amplifier 3 includes: a transmission and reception functional section (TRX) 13 for performing modulation and demodulation due to transmission and reception; an amplification section (T-PA) 14 for amplifying a transmission signal modulated by the transmission and reception functional section (TRX) 13; a transmission and reception-integrated section (TRX-INF) 3A for collecting transmission and reception signals inputted to and outputted from the transmission and reception functional section (TRX) 13; and a common section 16 configured by a functional section provided for each AMP section. The functional section provided for each AMP section also may include a functional section having an interface to external equipment, a functional section for subjecting external equipment or the like to the monitoring control, and a card of the common section for storing files or the like depending on the mounting.

The amplifiers 3 can cope with one sector by the transmission and reception functional section (TRX) 13, the amplification section (T-PA) 14, and the transmission and reception-integrated section (TRX-INF) 3A. Each of the transmission and reception-integrated sections (TRX-INF) 3A of each of the amplifiers 3, which is provided to correspond to each sector, is connected to the corresponding transmission and reception-integrated section (TRX-INF) 1A of the MDE section 1 via the optical fiber cable 2.

The amplifiers 3 include an OARA section 17 and an OARASC section 18. The OARA section 17 includes: a duplexer (DUP) 19 for selectively connecting the transmission side and the reception side to the antenna; and a low noise amplifier (LNA) 20 for amplifying a reception signal received by the antenna. In the example shown the drawing, two antennas are provided for diversity reception. Each of the antennas includes the duplexer (DUP) 19 and the low noise amplifier (LNA) 20. The OARASC section 18 subjects the OARA section 17 to the monitoring control and transmits a monitoring control signal to the MDE section 1 via the common section 16. In this embodiment, the OARA section 17 is illustratively shown as external equipment. However, the concept of external equipment also can include, in addition to the OARA, a power source unit, an antenna tilt control box, and a maintenance tool for example.

FIG. 5 shows the monitoring control range of the amplifier by the dotted line. The amplifier 3 is structured so that a functional section corresponding to one sector (sector #1 in this case) is set to have one monitoring control range. The common section 16 is set for one monitoring control range. The common section 16 and the MDE section 1 have therebetween a monitoring control link 30-1. The common section 16 uses this link to transmit and receive a monitoring control signal to and from the MDE section 1.

The MDE section 1 and the amplifier 3 (AMP section and OF-TRX section) also have a common interface for each link. This common interface has fixed common data format and sequence regarding a maintenance monitoring control. As a result, even when the MDE section 1 and the amplifiers 3 have different vendors, a common interface can be individually provided to each link to thereby realize a monitoring control-related communication.

Figure 6A:
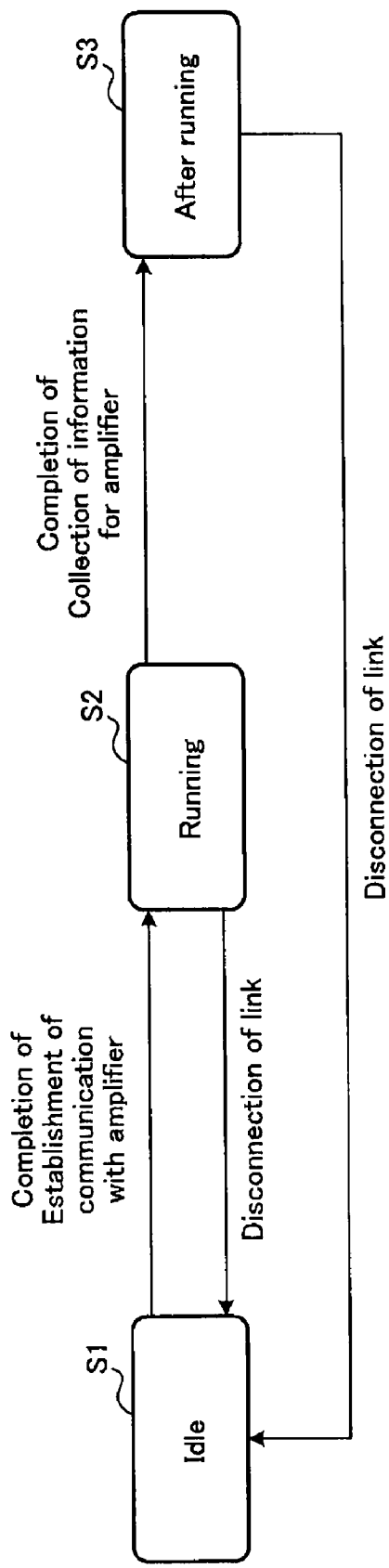
FIG. 6A illustrates a state transition of a transmission and reception-integrated section of an MDE section.
Figure 6B:
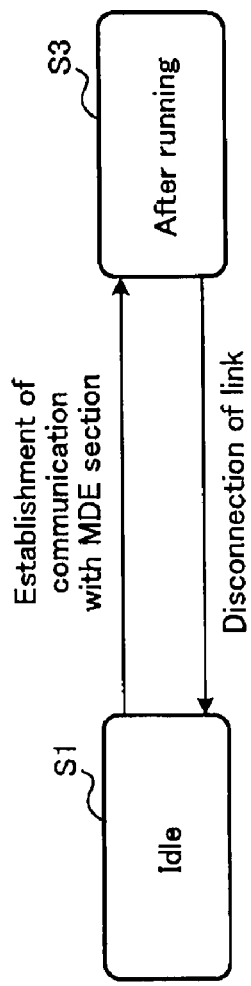
FIG. 6B illustrates the state transition of the transmission and reception-integrated section of the amplifier.

FIGS. 6A and 6B are a state transition diagram of the transmission and reception-integrated section (TRX-INF functional section) 1A of the MDE section 1 and the transmission and reception-integrated section (TRX-INF functional section) 3A of the amplifiers 3. As shown in FIG. 6A, the transmission and reception-integrated section 1A corresponding to each link of the MDE section 1 has an idle state S1 in which, when the link is disconnected, related information of the amplifiers 3 connected to the link (equipment configuration) is cleared to prepare for the establishment of communication with a new amplifier, a running state S2 for completing the establishment of communication with the new amplifier connected to the link, and an after-start state S3. After the establishment of communication with the new amplifier connected to the link, the information for the new amplifier is obtained (or the collection of the information for the new amplifier is completed) during the running (i.e., between the state S2 and the state S3) (i.e., the transmission and reception-integrated section of the MDE section 1 obtains, at the timing of the start thereof, the information for the amplifier for each link). After the after-start state S3, the transmission and reception-integrated section 1A performs various controls depending on the functional section (including an abnormal processing) such as an autonomous control or a control from a higher layer. When the link is disconnected during the running, the transmission and reception-integrated section 1A returns to the idle state S1.

On the other hand, the transmission and reception-integrated section (TRX-INF functional section) 3A of the amplifiers 3 has, as shown in FIG. 6B, two states of the idle state S1 in which the connection to a new link is waited at the disconnection of the link and the after-start state S3. The communication with the MDE section 1 is established between the idle state S1 and the after-start state S3.

Figure 7:
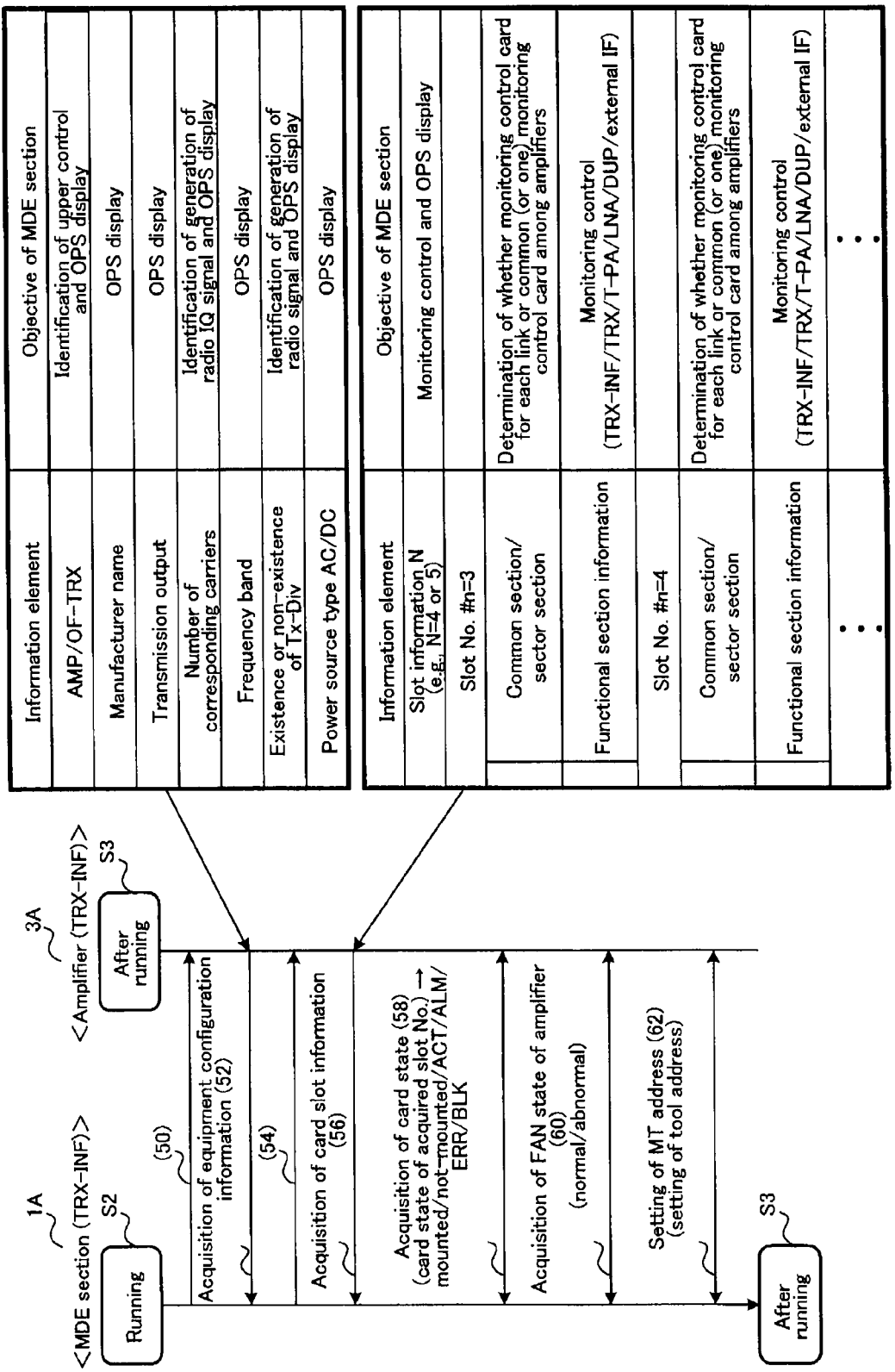
FIG. 7 illustrates the operation sequences of the transmission and reception-integrated section of the MDE section and the transmission and reception-integrated section of the amplifier.

FIG. 7 illustrates the operation sequence of the transmission and reception-integrated section 1A of the MDE section 1 and the transmission and reception-integrated section 3A of the amplifiers 3. As described earlier, when the transmission and reception-integrated section 1A of the MDE section 1 is in the running state S2, the transmission and reception-integrated section 1A prompts the transmission and reception-integrated section 3A of a new amplifier having an established communication to send equipment configuration information (Step 50). As a result, the transmission and reception-integrated section 3A of the amplifiers 3 gives the equipment configuration information of the amplifier to the transmission and reception-integrated section 1A of the MDE section 1 (Step 52). Thus, the transmission and reception-integrated section 1A of the MDE section 1 obtains the equipment configuration information of the amplifiers 3.

Thereafter, the transmission and reception-integrated section 1A of the MDE section 1 prompts the transmission and reception-integrated section 3A of the new amplifier having the established communication to send card slot information (Step 54). As a result, the transmission and reception-integrated section 3A of the amplifiers 3 gives the card slot information of the equipment to the transmission and reception-integrated section 1A of the MDE section 1 (Step 56). Thus, the transmission and reception-integrated section 1A of the MDE section 1 obtains the card slot information of the amplifiers 3. This card slot information includes various information factors shown in the table frame at the lower-right side of FIG. 7. These information factors are used in the MDE section 1 for the purpose shown at the right side.

When the card slot information is obtained in the manner as described above, the transmission and reception-integrated section 1A of the MDE section 1 obtains the card state (i.e., the card state of the obtained slot No. (mounted/not-mounted/ACT (state where the card can operate normally (operable))/ALM (alarm state)/ERR (error state)/BLK (state where a signal output from the card is not performed but an input of a signal and an internal processing may be performed) (Step 58) and obtains an amplifier FAN state (abnormal/normal) (Step 60). The transmission and reception-integrated section 1A of the MDE section 1 obtains the information related to the MT address setting (IP address setting for allowing a PC for a maintenance tool (MT) to connect to an amplifier side) (Step 62).

By allowing the MDE section 1A to obtain the card slot information and the card state from the amplifiers 3A as described above, the MDE section 1A can monitor the amplifiers 3A with regard to which card includes which functional section and which card has what kind of a state for example. By performing the monitoring as described above, the autonomous call control of the MDE section 1A can be achieved.

In this embodiment, a case is described where the information related to the amplifier is the equipment configuration information including various information factors shown in the table frame at the upper-right side of FIG. 7 the card slot information, the card state information, the amplifier FAN state information, and the MT address setting information. However, the present invention is not limited to this. The invention also can be used for a case where the information related to the amplifier is obtained via the respective links under the lead by the MDE section 1. The above information factors are used in the MDE section 1 for the purpose shown at the right side. The related information as described above is entirely written in a predetermined table (this table is cleared in the idle state S1). The OPS display in the table frame at the upper-right side of FIG. 7 means a display viewed in the operation.

As described above, in the wireless base station equipment of this embodiment, the MDE section 1 and the amplifiers 3 of the respective sectors have the transmission and reception-integrated sections 1A and 3A for terminating the communication, respectively. The information collected in the respective transmission and reception-integrated sections 1A and 3A is transmitted and received among the transmission and reception-integrated sections 1A and 3A via the respective links. Thus, the links are completely independent from each other (i.e., information to another link is independent) and another link is not influenced by the state of one link such as the suspension of the one link. Furthermore, the links have no restriction thereamong. Therefore, the amplifier 3 can be added or changed to perform a monitoring control (i.e., operation and management) smoothly without causing limitation on the card configuration and functional section of the amplifiers 3 for example and without causing any influence on the operating amplifiers 3 (e.g., suspension of the service). Furthermore, a conventionally-provided control for example also can be easily achieved (i.e., no need is required to change the mounting form of the higher layer even when the amplifier 3 is connected to various types of equipment).

Furthermore, in the wireless base station equipment of this embodiment, the transmission and reception-integrated section 1A corresponding to each link of the MDE section 1 is designed to clear the information regarding the amplifier 3 connected to the link when the link is disconnected therefrom. Thus, without being influenced by the information regarding the existing or previous amplifier 3, the latest information can be updated and a new amplifier 3 can be connected in a prompt and simple manner.

Furthermore, in the wireless base station equipment of this embodiment, the transmission and reception-integrated section 1A of the MDE section 1 is designed, at the timing of the start thereof, to obtain the information regarding the amplifier 3 for each link. Specifically, the transmission and reception-integrated section 1A corresponding to each link of the MDE section 1 is designed, after the communication with the amplifier 3 connected to the link is established, to obtain the information regarding the amplifier 3 during the running. Thus, no influence is caused on an operating sector and a service for setting an additional sector can be performed in a prompt and simple manner, thus achieving an operation for setting an additional sector in a simple and economical manner.

The present invention is not limited to the above embodiment and can be carried out in various different manners. For example, the number of the processing sections, the protocol stack, and the contents of the information related to the amplifier for example may be appropriately changed in a range not deviating from the scope of the present invention. Others also may be appropriately changed in a range not deviating from the scope of the present invention.

INDUSTRIAL APPLICABILITY

The present invention can be applied to wireless base station equipment that subjects an amplifier to a monitoring control by modulation and demodulation equipment.

What is claimed is:

1. Wireless base station equipment comprising:
a plurality of amplifiers; and
a modulation and demodulation equipment having a monitoring control link with each of the plurality of amplifiers, wherein
the modulation and demodulation equipment includes a plurality of transmission and reception-integrated sections that respectively terminate communications with the plurality of amplifiers and a monitoring control section that performs a monitoring control of each of the plurality of amplifiers, and
each of the plurality of amplifiers includes a plurality of cards as respective functional sections and a transmission and reception-integrated section that collects transmission and reception signals input to and output from each of the plurality of cards and terminates communication with a corresponding transmission and reception-integrated section of the modulation and demodulation equipment,
each transmission and reception-integrated section of the modulation and demodulation equipment obtains, from a transmission and reception-integrated section of a corresponding amplifier via a monitoring control link with the corresponding amplifier, information related to the corresponding amplifier which includes card slot information identifying a slot in which each card is mounted at the corresponding amplifier and a card state of each slot, and the monitoring control section of the modulation and demodulation equipment performs the monitoring control based on the obtained information.

2. The wireless base station equipment according to claim 1,
wherein each transmission and reception-integrated section of the modulation and demodulation equipment clears the obtained information regarding the corresponding amplifiers when the monitoring control link with the corresponding amplifier is disconnected.

3. The wireless base station equipment according to claim 1,
wherein each transmission and reception-integrated section of the modulation and demodulation equipment obtains the information related to the corresponding amplifier at a timing of starting the monitoring control link with the corresponding amplifier.

4. The wireless base station equipment according to claim 3,
wherein each transmission and reception-integrated section of the modulation and demodulation equipment obtains, after the monitoring control link with the corresponding amplifier is established, the information related to the corresponding amplifier during the running thereof.

5. The wireless base station equipment according to any of claims 1 to 4,
wherein a monitoring control signal is transmitted and received among each of the plurality of amplifiers and the modulation and demodulation equipment via a common interface for all links.

6. The wireless base station equipment according to any of claims 1 to 4,
wherein each of the plurality of amplifiers is provided to be remote from the modulation and demodulation equipment via a transmission line.

7. A monitoring control method in a system including a plurality of amplifiers and a modulation and demodulation equipment having a monitoring control link with each of the plurality of amplifiers, the method comprising:
terminating communications with the plurality of amplifiers by a plurality of transmission and reception-integrated sections of the modulation and demodulation equipment;
performing a monitoring control of each of the plurality of amplifiers by a monitoring control section of the modulation and demodulation equipment;
collecting, by a transmission and reception-integrated section of each of the amplifiers, transmission and reception signals input to and output from each of a plurality of cards included as respective functional sections in each of the plurality of amplifiers;
terminating, by the transmission and reception-integrated section of each of the amplifiers, communication with a corresponding transmission and reception-integrated section of the modulation and demodulation equipment;
obtaining, by each transmission and reception-integrated section of the modulation and demodulation equipment from a transmission and reception-integrated section of a corresponding amplifier via a monitoring control link with the corresponding amplifier, information related to the corresponding amplifier which includes card slot information identifying a slot in which each card is mounted at the corresponding amplifier and a card state of each slot, and performing, by the monitoring control section of the modulation and demodulation equipment, the monitoring control based on the obtained information.

8. The monitoring control method according to claim 7, further comprising:
clearing, by each transmission and reception-integrated section of the modulation and demodulation equipment, the information regarding the corresponding amplifiers when the monitoring control link with the corresponding amplifier is disconnected.

9. The monitoring control method according to claim 7, further comprising:
obtaining, by each transmission and reception-integrated section of the modulation and demodulation equipment, the information related to the corresponding amplifier at a timing of starting the monitoring control link with the corresponding amplifier.

10. The monitoring control method according to claim 9, further comprising:
obtaining, by each transmission and reception-integrated section of the modulation and demodulation equipment, after the monitoring control link with the corresponding amplifier is established, the information related to the corresponding amplifier during the running thereof.

11. The monitoring control method according to any of claims 7 to 10, further comprising:
transmitting and receiving a monitoring control signal among each of the plurality of the amplifiers and the modulation and demodulation equipment via a common interface for all links.

12. The wireless base station equipment according to claim 1, wherein
the information related to the corresponding amplifier obtained by each of the transmission and reception-integrated sections of the modulation and demodulation equipment from the transmission and reception-integrated section of the corresponding amplifier includes an operational state of the corresponding amplifier.

13. The wireless base station equipment according to claim 1, wherein
the information related to the corresponding amplifier obtained by each of the transmission and reception-integrated sections of the modulation and demodulation equipment from the transmission and reception-integrated section of the corresponding amplifier includes at least one of a manufacturer name, a number of subcarriers, a frequency band and a type of power source of the corresponding amplifier.

14. The wireless base station equipment according to claim 1, wherein
the card state of each slot obtained by each of the transmission and reception-integrated sections of the modulation and demodulation equipment from the transmission and reception-integrated section of the corresponding amplifier includes information identifying each slot of the corresponding amplifier and whether a card is included or not included in each slot.

15. The wireless base station equipment according to claim 1, wherein
the information related to the corresponding amplifier obtained by each of the transmission and reception-integrated sections of the modulation and demodulation equipment from the transmission and reception-integrated section of the corresponding amplifier includes information indicating an alarm state of each card mounted in the corresponding amplifier.

16. The wireless base station equipment according to claim 1, wherein the information related to the corresponding amplifier obtained by each of the transmission and reception-integrated sections of the modulation and demodulation equipment from the transmission and reception-integrated section of the corresponding amplifier includes information indicating a block state of each card mounted in the corresponding amplifier, the block state indicating that the card is not outputting a signal but is capable of receiving an input signal for internal processing by the corresponding amplifier.

17. The wireless base station equipment according to claim 1, wherein the information related to the corresponding amplifier obtained by each of the transmission and reception-integrated sections of the modulation and demodulation equipment from the transmission and reception-integrated section of the corresponding amplifier includes an Internet Protocol (IP) address of the corresponding amplifier.

* * * * *